US 12,153,843 B2

(12) United States Patent
Sheeran et al.

(10) Patent No.: US 12,153,843 B2
(45) Date of Patent: Nov. 26, 2024

(54) MAILING OPTIMIZATION SYSTEMS AND METHODS

(71) Applicant: DMT Solutions Global Corporation, Danbury, CT (US)

(72) Inventors: Katherine Sheeran, Danbury, CT (US); John T. Dyer, Oxford, CT (US); Joseph Eremita, Alpharetta, GA (US); Ray Grant, Windham, NH (US); Eddy Edel, New Milford, CT (US)

(73) Assignee: DMT Solutions Global Corporation, Danbury, CT (US)

( * ) Notice: Subject to any disclaimer, the term of this patent is extended or adjusted under 35 U.S.C. 154(b) by 164 days.

(21) Appl. No.: 18/079,447

(22) Filed: Dec. 12, 2022

(65) Prior Publication Data

US 2023/0185502 A1    Jun. 15, 2023

Related U.S. Application Data

(60) Provisional application No. 63/288,252, filed on Dec. 10, 2021.

(51) Int. Cl.
*G06F 3/12* (2006.01)
*G06Q 50/26* (2012.01)

(52) U.S. Cl.
CPC .......... *G06F 3/1264* (2013.01); *G06F 3/1206* (2013.01); *G06F 3/1245* (2013.01); *G06Q 50/26* (2013.01); *G06F 3/1288* (2013.01)

(58) Field of Classification Search
CPC .... G06F 3/1264; G06F 3/1206; G06F 3/1245; G06F 3/1288; G06Q 50/26; G06Q 10/083
See application file for complete search history.

(56) References Cited

U.S. PATENT DOCUMENTS

| | | |
|---|---|---|
| 2009/0313060 A1 | 12/2009 | Evevsky |
| 2016/0042319 A1 | 2/2016 | Mauch |
| 2018/0113658 A1* | 4/2018 | Sikkink ................. G06F 3/1263 |

OTHER PUBLICATIONS

International Search Report and Written Opinion issued in International Application No. PCT/US2022/052539, date of mailing: May 23, 2023, 14 pages.

* cited by examiner

*Primary Examiner* — Eric A. Rust
(74) *Attorney, Agent, or Firm* — Brown Rudnick LLP; Matthew P. York

(57) ABSTRACT

The systems and methods of the present invention provide optimized mailpiece batching, production, and mailing based on historical and real time, or near-real time, data such as target delivery time, mail fabrication processing costs and capacity, tracked transit times and costs for mailing between induction points and target addresses, and transport times and costs from various printers to various induction points. Additional considerations such as bulk discounts can be used in the analysis to ensure maximum cost reduction while achieving contract delivery times using distributed printing.

20 Claims, 5 Drawing Sheets

MAILING OPTIMIZATION SYSTEMS AND METHODS

CROSS-REFERENCE TO RELATED APPLICATIONS

This application claims priority to, and the benefit of, U.S. Provisional Application No. 63/288,252, filed Dec. 10, 2021, the content of which is incorporated by reference herein in its entirety.

TECHNICAL FIELD

The present invention relates generally to mailpiece fabrication systems and methods, and, more particularly, to systems and methods for optimizing production of mailpieces and subsequent induction of said mailpieces into a mailstream to minimize overall cost and delivery time.

BACKGROUND

The U.S. Postal Service (USPS) 10-year plan (released in March 2021) acknowledged, among other things, that the USPS needed to improve their service standards. In particular, the USPS has acknowledged that they have not been consistently meeting their service standards for a number of years. For example, delivery performance for First-Class Mail self-reported by the USPS on Sep. 27, 2021 found that 88.5 percent of First-Class mail was delivered on time while marketing mail (i.e., standard mail) was delivered on time 92.5 percent of the time and periodicals were delivered on time 82.5 percent of the time. These delivery times are typically impacted by weather, mail volume, available capacity, as well as the effectiveness of sites, labor shortages, and other factors. However, printers and mailers are often contractually obligated to deliver mail by a certain deadline in order to meet their margins, at or below a certain cost. Accordingly, an unpredictable delivery schedule (due in part to the subpar performance of the USPS) can severely impact those printing and mailing companies trying to meet client demands.

SUMMARY

The systems and methods of the present invention address inconsistency in mail delivery times by tracking and predicting mail delivery times to specific locations from a variety of induction points and optimizing mail production and induction of mailpieces into the mailstream to ensure target delivery times are met at the lowest cost to the mailer.

Historically, to maintain the required printing quality for mailpieces, production was limited to a few large and expensive printing machines in specific geographic locations. Accordingly, printing/production of pieces was geographically limited and, therefore, there were limited viable induction points into the USPS mail service. With modern electronic files and the arrival of cheap, high quality printing, production can now be distributed in smaller batch sizes to a much greater number of available printers in more geographic areas. With distributed printing comes an abundance of choice. Systems and methods of the invention recognize this development and take advantage of distributed production to allow for selective production and induction based on cost, delivery times, and other considerations. That information (e.g., cost and delivery times) can be determined through historic and real time, or near-real time, tracking data monitoring mail speed along various routes as well as vendor inputs regarding printing and mailing costs. In certain instances, independent (or affiliated) transport from a production facility to a non-local mail induction point may be advisable for cost and/or speed purposes. In such embodiments, vendor estimates for trucking can be included in the analysis to find the optimum combination of printer and induction point for each piece of mail. It may be possible that mailpieces produced at the same printing location may have different optimal induction points into the mailstream. In such instances, different sub-batches of mail (produced at the same printer) may be subsequently divided (e.g., where one sub-batch is mailed locally while another is trucked to a different location for mailing).

Accordingly, systems and methods of the present invention can help printers and mailers reduce delivery time of first-class mail, standard mail, and/or Periodicals by driving automation and intelligent distribution of the documents to print and mail operations located in different parts of the country. Location and route-specific postal historical delivery performance data can be used to determine point to point delivery times based on actual recent and historical measured transit times. The measured delivery times can be used to define/suggest current optimal creation and entry points for a provided list of delivery locations (e.g., zip codes, groups of zip codes, or even individual addresses).

The mail can then be electronically transferred to a printer near an optimal entry point in an effort to reduce the overall delivery time without impacting the mailpiece postage cost. In certain embodiments, the mail can be physically trucked to a BMC (Bulk Mail Center) or SCF (Sectional Center Facility) to achieve additional discounts and faster delivery times. Bulk mail rates from vendors such as the USPS can be based on a certain volume of mail in a certain geographic area and printer and induction location choices can be informed by these requirements to ensure that maximum discounts are achieved and maintained. Additionally, jobs from multiple mail customers can be pooled for more efficient packaging of print and mailing tasks. In certain embodiments, print and mail tasks can be analyzed on a piece-by-piece basis based on delivery destination and can then be re-batched (even with documents from other jobs) to be grouped with other documents having the same optimal print and induction locations. Those batches can then be sent to their respective printers, printed, and introduced into the mailstream at the optimum location for timeliness and costs. In various embodiments, those mailpieces can be tracked in real time, or near-real time, and that data can be fed back into the analysis algorithm to inform subsequent batching, printing, transport, and/or induction decisions.

While induction points and transport services are generally described herein with respect to the United States and the USPS, any foreign post or third-party transporter/delivery service can be used with methods of the invention. For example, foreign postal services, including, but not limited to, Royal Mail, La Poste, Deutsche Post, Japan Post, Korea Post, China Post, Canada Post, Correos de Mexico, Empresa Brasileira de Correios e Telégrafos, Russian Post, Poste Italiane, Sociedad Estatal de Correos y Telégrafos, S.A. and An Post can be included in the systems and methods of the invention in replacement of or in addition to the USPS.

Aspects of the invention can include methods for producing and sending mail comprising: providing a plurality of electronic document files and, for each of the plurality of electronic document files, one or more postal addresses for recipients and a target delivery time; and analyzing the one or more postal addresses using data such as estimated delivery times to the one or more postal address from a plurality of induction points, shipping cost to the one or more postal addresses from each of the plurality of induction points, printer capacity for a plurality of printers, printer cost for the plurality of printers, printer location for the plurality of printers relative to the plurality of induction points, cost of alternative transport from the plurality of printers to the plurality of induction points, capacity of alternative transport from the plurality of printers to the plurality of induction points, and volume-based shipping discount requirements for each of the plurality of induction points. Based on the analyzing step to meet the target delivery time for each of the plurality of electronic document files and recipients at a lowest cost, methods can then include dividing each recipient of each of the plurality of electronic document files into one or more batches and for each batch selecting a printer from the plurality of printers, an induction point from the plurality of induction points, and a transportation method from the selected printer to the selected induction point. Methods can then include sending each of the one or more batches of electronic document files and recipients to its selected printer to create a printed document for each recipient of each of the plurality of electronic document files in the batch. Each printed document can then be transported from each selected printer to its respective selected induction point using each respective selected transportation method and the transported documents can then be mailed from each respective selected induction point to their respective recipient at the recipient's postal address.

Methods of the invention can include tracking cost and delivery times for each of the electronic document file for each recipient and using that data in subsequent analyzing steps for subsequent electronic document files and recipients. In certain embodiments, the analyzing step can uses data consisting of each of estimated delivery times to the one or more postal address from a plurality of induction points, shipping cost to the one or more postal addresses from each of the plurality of induction points, printer capacity for a plurality of printers, printer cost for the plurality of printers, printer location for the plurality of printers relative to the plurality of induction points, cost of alternative transport from the plurality of printers to the plurality of induction points, capacity of alternative transport from the plurality of printers to the plurality of induction points, and volume-based shipping discount requirements for each of the plurality of induction points. The induction point may be a bulk mail center or a sectional center facility. The induction points may be for United States Post Office mailing. The induction points may be for third party shippers.

In certain embodiments, one or more of the data are provided in real time, or near-real time. The estimated delivery times can be determined from real time and historical tracking data. Methods may include weighting the historical and real time tracking data to increase weight of real time tracking data over historical tracking data. The analyzing step can further comprise using weather or news feeds for the induction points and the routes between each induction points and each recipient. Methods may include obtaining the plurality of electronic document files from a plurality of different providers. Methods may further comprise converting the plurality of electronic document files to a common format before the sending step. The common format may be virtual dynamic document (VDD).

In certain embodiments, methods may include extracting the one or more postal addresses for recipients from the plurality of electronic document files. The selected printer or the selected transportation method may be a third-party provider and one or more of the printer cost, printer capacity, alternative transport cost, alternative transport capacity bid info provided by users, and volume-based shipping discounts are provided by third party bids In various embodiments, methods may include providing one or more of the data to a third-party. Methods may include determining a cost estimate for delivery of a printed mailer of one or more of the plurality of electronic document files to one or more recipients in the target delivery time based using the data.

BRIEF DESCRIPTION OF THE DRAWINGS

Features and advantages of the claimed subject matter will be apparent from the following detailed description of embodiments consistent therewith, which description should be considered with reference to the accompanying drawings.

For a thorough understanding of the present disclosure, reference should be made to the following detailed description, including the appended claims, in connection with the above-described drawings. Although the present disclosure is described in connection with exemplary embodiments, the disclosure is not intended to be limited to the specific forms set forth herein. It is understood that various omissions and substitutions of equivalents are contemplated as circumstances may suggest or render expedient.

DETAILED DESCRIPTION

By way of overview, the present invention is directed to systems and methods for optimizing production of mailpieces and subsequent induction of said mailpieces into a mailstream to minimize overall cost and delivery time. It should be noted that systems and methods of the invention are preferably executed by computers consisting of a processor coupled to a tangible, non-transient memory including instructions for the processor to execute certain steps of the invention. Analysis steps, for example, can be performed using a computer and may be performed using a network or cloud-based solution or locally (on premises) to provides a digital hub for centralized processing and distribution as well as fast and easy inclusion for cooperative mailers/locations that wish to participate in the program (providing data and/or services or using optimization services).

Figure 1:
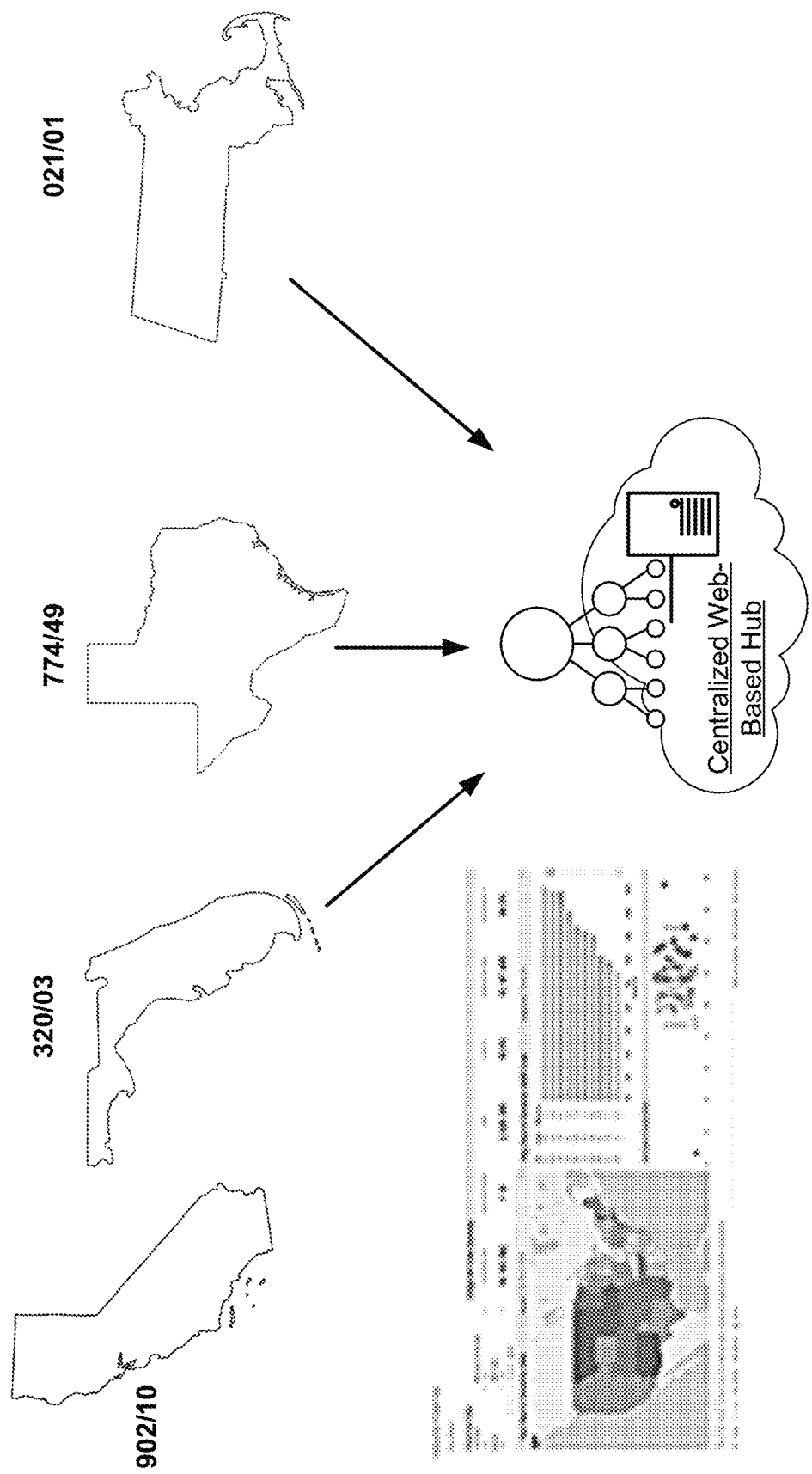
FIG. 1 illustrates a computer system of the invention receiving postal data.
Figure 2:
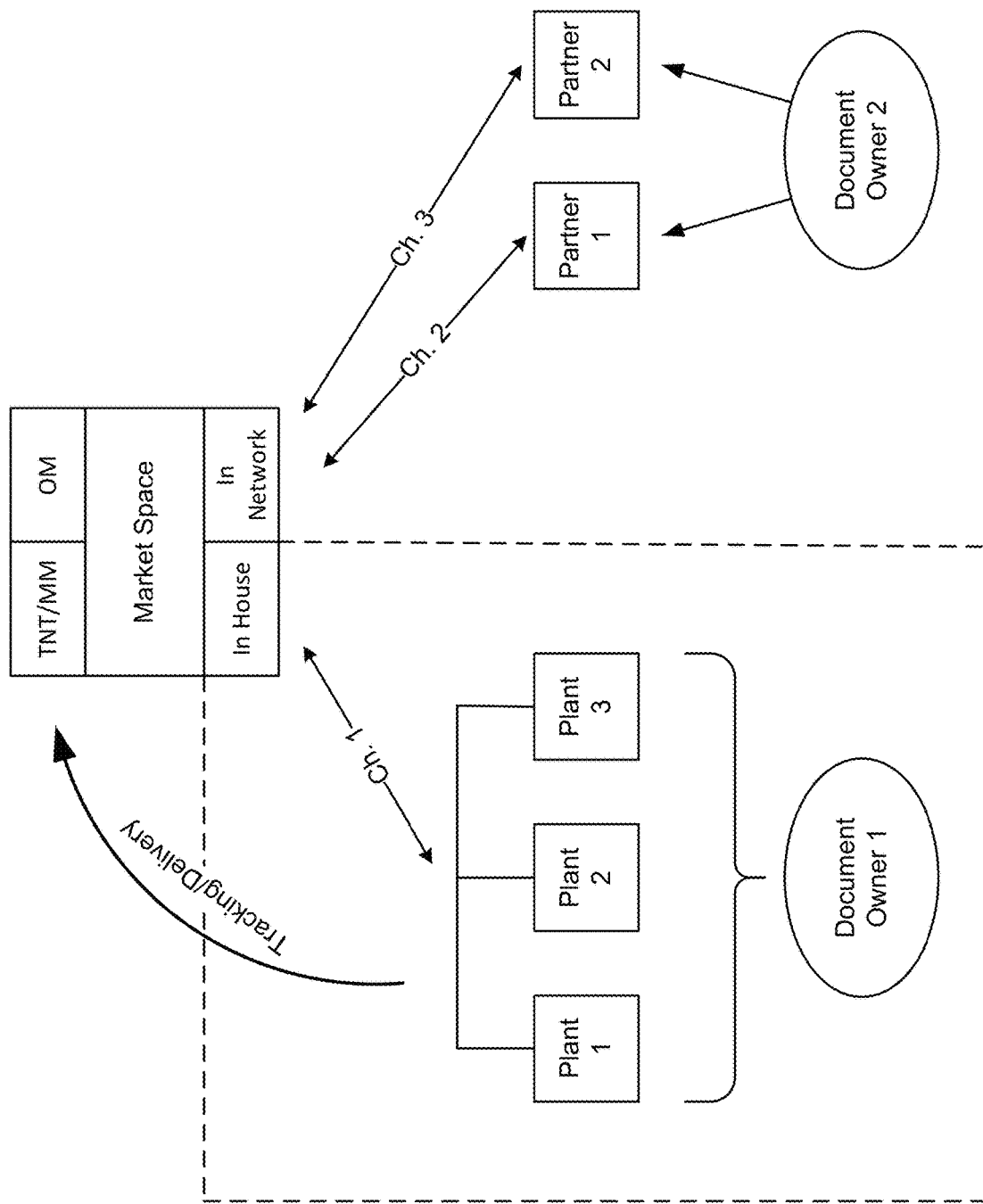
FIG. 2 diagrams steps of certain methods of the invention for receiving, analyzing, and distributing documents for mailing.

FIG. 1 illustrates an exemplary computing system of the invention which is receiving tracking data for mail between various zip codes to determine the best induction point from a cost, capacity, and timeliness standpoint. FIG. 2 diagrams a contemplated market and process using methods of the invention.

As illustrated, document owners approach partner contractors to handle a mailing project. Those partner contractors receive from the document owner a document to be mailed (e.g., an electronic document to be printed and mailed), a target recipient list with addresses, and a target delivery time. In certain embodiments, the addresses may be extracted by the contracting partner from the document owner's documents (e.g., through text analysis). Those contracting partners can then access the systems and methods of the invention to determine (to achieve the agreed-on delivery time at the lowest cost) the best induction point for the mailpieces into the mail system and the best printer for producing the documents. Based on historic and real time, or near-real time, data fed into the system, documents can be divided and re-batched with documents from other partners and/or document owners based on common optimum induction points and then those batches can be sent to a printer selected based on cost, proximity to the optimum induction point, capacity, and/or other considerations (e.g., contracting partner preference). In certain embodiments, where the contracting party has expertise and/or capacity in printing, transporting, or mailing, certain tasks may be optimally performed in-house. In other cases, batches may be optimally distributed to third-parties.

Figure 3A:
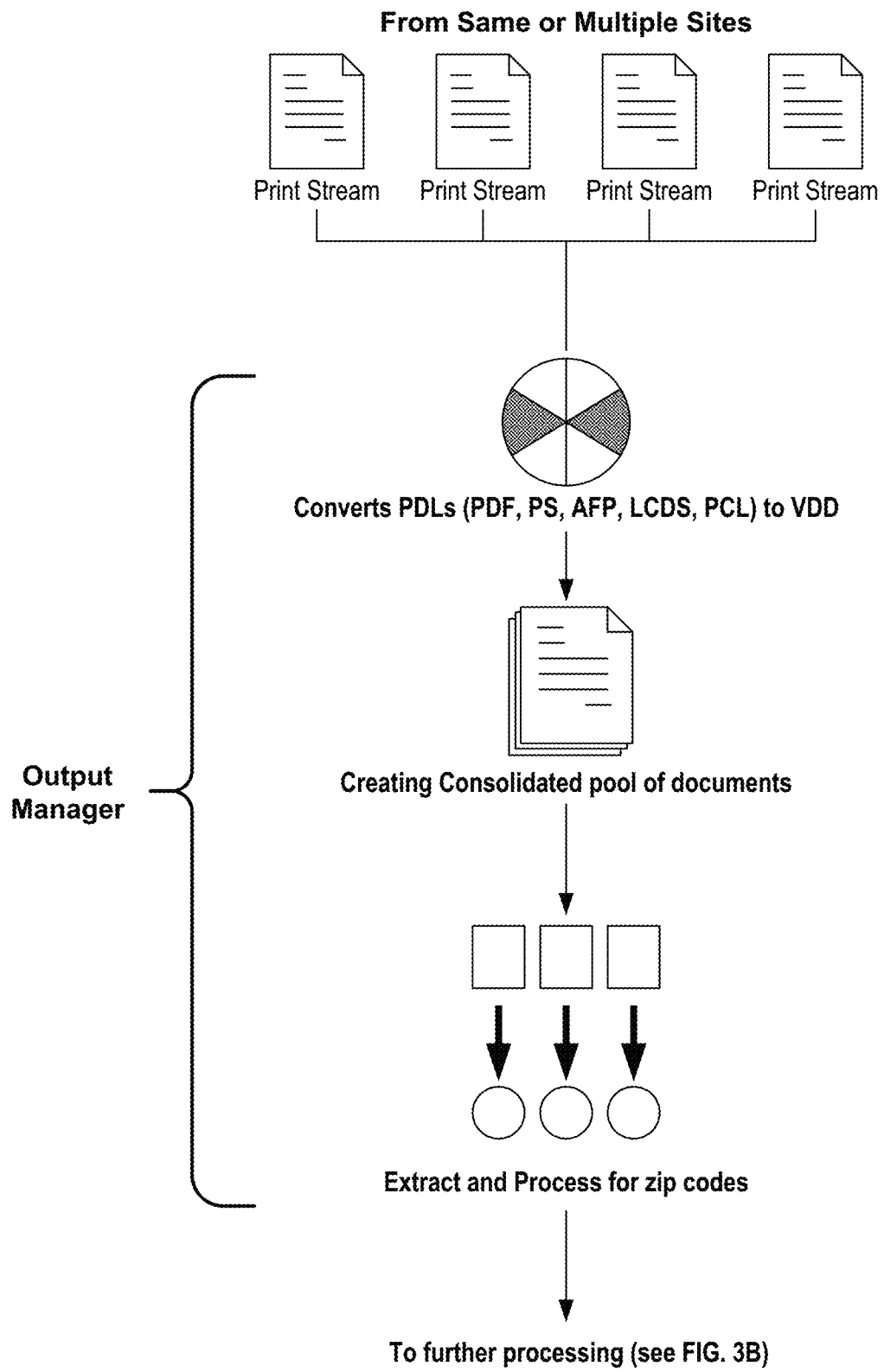
FIGS. 3A, 3B, and 3C diagram methods of the invention according to certain embodiments from receiving digital files through induction into the mailstream.
Figure 3B:
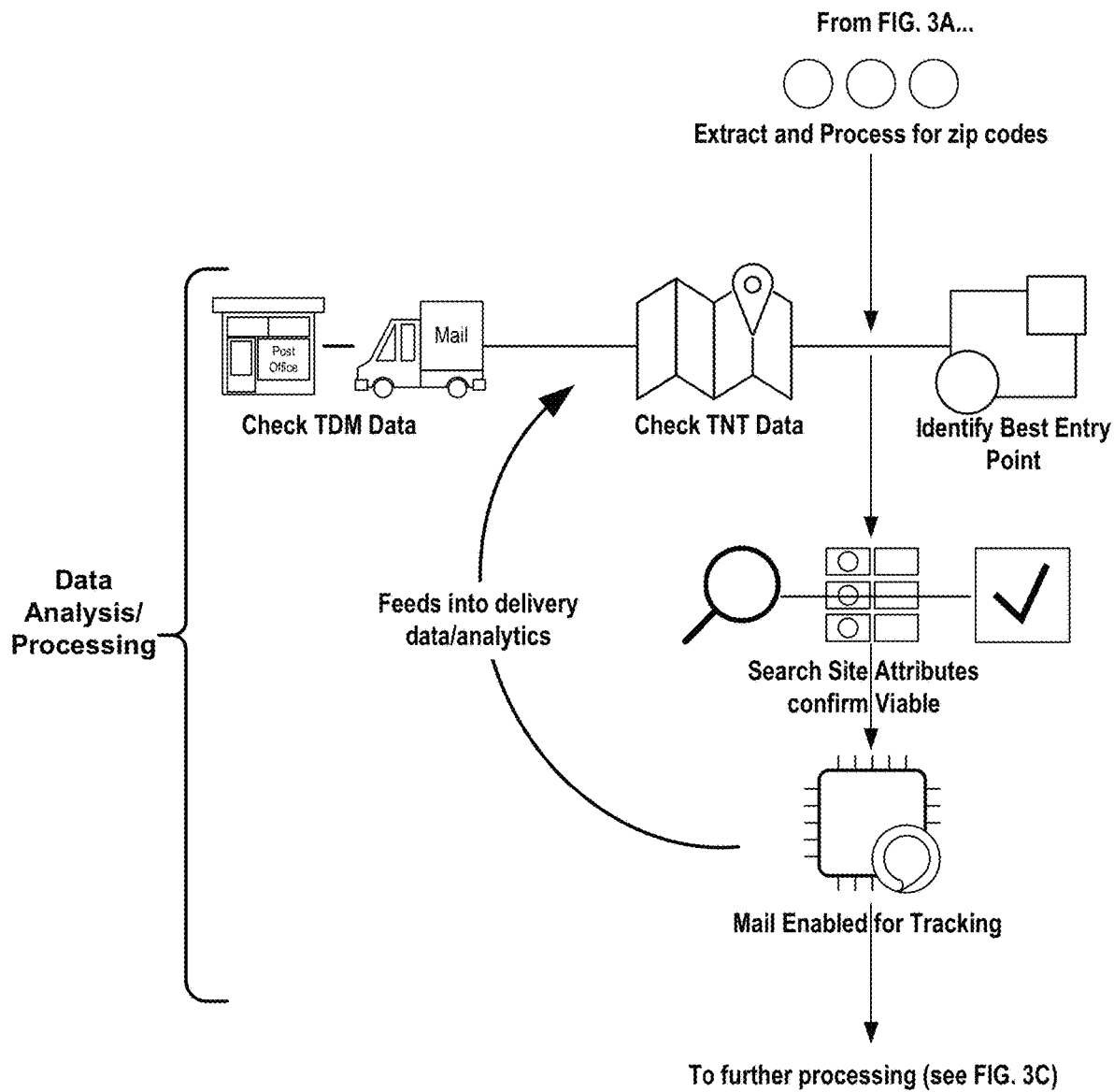
Figure 3C:
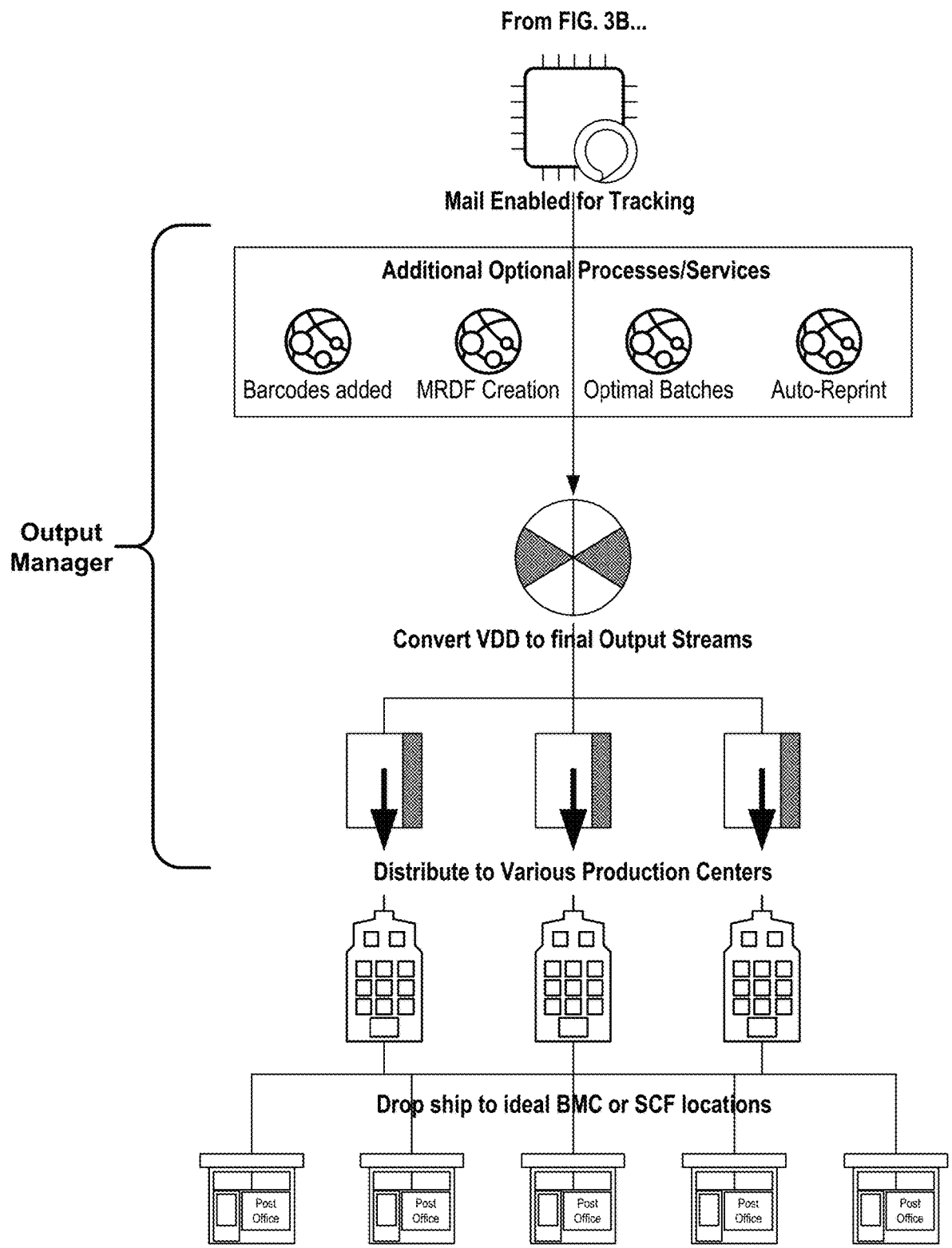

FIGS. 3A, 3B, and 3C illustrate steps of an exemplary method of the invention in greater detail. First, documents in a print stream are intercepted or obtained from a document owner. The documents can be in electronic formats (e.g., Metacode, PDF, PS, AFP, LCDS, or PCL) or may be obtained as hard physical copies of documents. Physical documents can then be scanned or otherwise digitized and converted into electronic images of the document for further processing. In certain embodiments, the documents can be finally converted to a single common electronic format such as virtual dynamic document (VDD).

Documents can be obtained from a number of different document owners and pooled together. Savings and efficiency can be maximized based on volume due to volume-based shipping and potentially printing discounts and, therefore, pooling documents can be advantageous to bring economies of scale into play. Address data (e.g., zip codes or specific addresses) can be obtained separately and associated electronically with documents in the print stream or may be extracted from the documents themselves using computer analysis such as text recognition methods known in the art. Additionally, a target delivery time can be assigned to each recipient for each document. The pooled documents, along with recipient and delivery time information can then be entered into the system for analysis.

The system can consist of an algorithm that relies on other input data to determine the optimum print and induction points and transportation methods between those points (if needed). That other input data can include, for example, any or all of estimated delivery times to the one or more postal address from a plurality of induction points, shipping cost to the one or more postal addresses from each of the plurality of induction points, printer capacity for a plurality of printers, printer cost for the plurality of printers, printer location for the plurality of printers relative to the plurality of induction points, cost of alternative transport from the plurality of printers to the plurality of induction points, capacity of alternative transport from the plurality of printers to the plurality of induction points, and volume-based shipping discount requirements for each of the plurality of induction points. Volume-based or other shipping discount requirements can include, for example, commercial mail prices provided by USPS based on minimum quantities and maintaining and maximizing those discounts can be considered when selecting induction points and batching documents to printers and induction points.

Much of that data can be obtained from existing postal data and document composition software like output manager, track-n-trace (TNT), and TruckDirectMail (TDM) commercially available from DMT Solutions Global Corporation dba BlueCrest (Danbury, CT) and BCC Software, a BlueCrest Company. In certain embodiments, data can be provided by third parties (e.g., printers or alternative transporters). In various embodiments, third-party cost data may be provided by competitive bids in real time, or near-real time, through an on-line platform that matches jobs to print/shipping vendors based.

Based on the analyzing step several selections can be made in order to meet the target delivery time for piece of mail for each recipient at the lowest cost. The selections can include the optimum induction point for each piece of mail and a printer based, for example, on capacity, cost, and proximity to the optimum induction point, and, where needed, a method of transport (e.g., independent trucking) from a selected printer to the optimum induction point. The mail can then be re-batched, piece-by-piece, based on common optimum induction points and printers and each of those batches then sent to their respective selected printer. In certain embodiments, these selections will be automatic while in others a series of options with estimated costs, delivery times, and other information can be provided to a user for final selection via a user interface. Various batches may have common selections with other batches while differing in other selections. For example, two batches may have the same selected printer but different selected induction points (or vice versa). Accordingly, those batches could be printed at the same location but then divided out for different induction points (e.g., one may be mailed locally from the printer while another may be loaded into a third-party or in-house truck and driven to another state for delivery to a different USPS or other postal service induction point).

Once a printer and/or other services are selected, they can be first contacted to ensure capacity and confirm costs and other information if necessary. The printer can then produce the mailpieces for the recipients assigned to them in their batch and, depending on the selected printer and induction point, transport the printed documents to the induction point for mailing. As noted, in certain embodiments, the cheapest or most effective printer may be some distance from the optimum induction point but, based on third-party or in-house trucking costs and times, those printer and induction point combinations may still be viable and even optimum. In such instances, the printed material can then be turned over for transport to the selected induction point. During printing and mail preparation, the mailpieces can be marked for tracking so that their progress along the route from the selected printer, to the selected induction point, to the final recipient can be monitored and that data fed back into the algorithm to provide real time, or near-real time, updates for ongoing or future print tasks.

It should further be noted that, in some embodiments, the systems and methods of the present invention may simply decide the best facility for distribution of work and the like (in the fabrication and mailing of a mailpiece) regardless of trucking and/or distribution involved. In particular, the systems and methods are configured to function as a means of allocating work to different locations both in and out of network, based off labor availability, materials, specific machines available and their capabilities, client specific restraints compared to location capabilities, and the like. It should further be noted that, in certain instances in which a pick up is already scheduled at chosen facility, no additional "trucking" scheduling is needed, as it is assumed for particular location. Furthermore, systems and methods of the present invention are configured to contemplate multi-stop (i.e., pick up) options for trucking consoles to allow for splitting/sharing costs for end induction point.

In various embodiments, the induction point may be a bulk mail center or a sectional center facility which can allow for additional postal discounts when using the USPS.

In certain embodiments, third party platforms may provide an alternative to USPS for end-recipient delivery. For example, excess capacity in Amazon, UPS, FedEx or other delivery services can be posted along with costs and delivery times that may provide a viable alternative to USPS transport. In other countries, local postal services (governmental or private) may prove a more advantageous option for cost and/or timeliness. Foreign postal services such as Royal Mail, La Poste, Deutsche Post, Japan Post, Korea Post, China Post, Canada Post, Correos de Mexico, Empresa Brasileira de Correios e Telégrafos, Russian Post, Poste Italiane, Sociedad Estatal de Correos y Telégrafos, S.A. and An Post can be included in the systems and methods of the invention in replacement of or in addition to the USPS.

As discussed above, estimated delivery times can be determined based on real time, or near-real time, as well as historical tracking data obtained from the tracking of mailpieces passed through the system or from alternative inhouse or third-party tracking software and reporting. In certain embodiments, estimated delivery times for various routes can be determined from weighted historical and real time, or near-real time, data where more recent data is assigned a greater weight to account for changes over time. In addition to real time, or near-real time, and historic data, estimated delivery times may take into account current events to anticipate issues with certain routes. For example, weather data, and news feeds for various induction points and along the routes between the induction points and recipients can be monitored and fed into the system. Accordingly, news of weather events such as blizzard or hurricane or disruptions such as protests, work stoppages, or local quarantine or lockdown rules can be used to anticipate slower delivery times for certain induction points and routes, even if historic tracking data indicates a route would otherwise be optimal.

In certain embodiments, the data and analysis thereof may be provided to a third-party such as the USPS itself to aid in improving service or to negotiate induction points, discounts, and to inform staffing decisions to ensure speedy delivery. Methods of the invention may further be used to prepare estimates in the first instance in print/mail contracting for both delivery time and anticipated costs. Users can also re-allocate work to additional options within their network for capacity reasons as well as accept work should they have open capacity using systems and methods of the invention.

Any development environment or language known in the art may be used to implement embodiments of the invention. Methods described herein can be performed using a system that includes hardware as well as software and optionally firmware. For example, a system of the invention may include a computer including an input/output device (I/O), coupled to a processor and a non-transient, tangible memory. The computer may be in communication with other computers or a server through a network. A computer such as a personal computing device (e.g., a laptop, desktop, tablet) may be used to implement embodiments of the invention. In general, a computer includes a processor coupled to memory and at least one input/output device.

A processor may be any suitable processor such as the microprocessors commercially available from Intel (Santa Clara, CA) and AMD (Sunnyvale, CA). Memory generally includes a tangible, non-transitory computer-readable storage device and can include any machine-readable medium or media on or in which is stored instructions (one or more software applications), data, or both. The instructions, when executed, can implement any or all of the functionality described herein. The term "computer-readable storage device" shall be taken to include, without limit, one or more disk drives, tape drives, flash drives, solid stated drives (SSD), memory devices (such as RAM, ROM, EPROM, etc.), optical storage devices, and/or any other non-transitory and tangible storage medium or media.

Input/output devices according to the invention may include a video display unit (e.g., a liquid crystal display (LCD) or a cathode ray tube (CRT) monitor), an alphanumeric input device (e.g., a keyboard), a cursor control device (e.g., a mouse or trackpad), a disk drive unit, a signal generation device (e.g., a speaker), a touchscreen, an accelerometer, a microphone, a cellular radio frequency antenna, and a network interface device, which can be, for example, a network interface card (NIC), Wi-Fi card, or cellular modem.

Reference throughout this specification to "one embodiment" or "an embodiment" means that a particular feature, structure, or characteristic described in connection with the embodiment is included in at least one embodiment. Thus, appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents.

INCORPORATION BY REFERENCE

References and citations to other documents, such as patents, patent applications, patent publications, journals, books, papers, web contents, have been made throughout this disclosure. All such documents are hereby incorporated herein by reference in their entirety for all purposes.

EQUIVALENTS

Various modifications of the invention and many further embodiments thereof, in addition to those shown and described herein, will become apparent to those skilled in the art from the full contents of this document, including references to the scientific and patent literature cited herein. The subject matter herein contains important information, exemplification and guidance that can be adapted to the practice of this invention in its various embodiments and equivalents thereof.

What is claimed is:

1. A method for producing and sending mail, the method comprising:
   receiving a plurality of electronic document files and associated information for each of the plurality of electronic document files, the associated information comprising one or more postal addresses for recipients and a target delivery time;
   analyzing the one or more postal addresses using data selected from two or more of the group consisting of: estimated delivery times to the one or more postal address from a plurality of induction points, shipping cost to the one or more postal addresses from each of the plurality of induction points, printer capacity for a plurality of printers, printer cost for the plurality of printers, printer location for the plurality of printers relative to the plurality of induction points, cost of alternative transport from the plurality of printers to the plurality of induction points, capacity of alternative transport from the plurality of printers to the plurality of induction points, weather conditions potentially impacting postal distribution, and volume-based shipping discount requirements for each of the plurality of induction points;

based on the analyzing step to meet the target delivery time for each of the plurality of electronic document files and recipients at a lowest cost, dividing each recipient of each of the plurality of electronic document files into one or more batches and, for each batch, selecting:
- a printer from the plurality of printers;
- an induction point from the plurality of induction points; and
- a transportation method from the selected printer to the selected induction point;

transmitting each of the one or more batches of electronic document files and recipients to its selected printer to create a printed document for each recipient of each of the plurality of electronic document files in the batch;

transporting the printed documents from each selected printer to its respective selected induction point using each respective selected transportation method; and mailing the transported documents from each respective selected induction point to their respective recipient at the recipient's postal address.

2. The method of claim 1, further comprising tracking cost and delivery times for each of the electronic document file for each recipient and using that data in subsequent analyzing steps for subsequent electronic document files and recipients.

3. The method of claim 1, wherein the analyzing step uses data comprising one or more of: estimated delivery times to the one or more postal address from a plurality of induction points, shipping cost to the one or more postal addresses from each of the plurality of induction points, past effectiveness of one or more of the plurality of induction points for a destination or zip code associated with the recipient's postal address, printer capacity for a plurality of printers, printer cost for the plurality of printers, characteristics of the plurality of printers, printer location for the plurality of printers relative to the plurality of induction points, cost of alternative transport from the plurality of printers to the plurality of induction points, capacity of alternative transport from the plurality of printers to the plurality of induction points, characteristics for the plurality of printers, material availability associated with a given document to be printed, legal requirements associated and volume-based shipping discount requirements for each of the plurality of induction points.

4. The method of claim 1, wherein the induction point comprises a bulk mail center or a sectional center facility.

5. The method of claim 1, wherein the induction points are for a United States Postal Service mailing.

6. The method of claim 1, wherein the induction points are for third party shippers.

7. The method of claim 1, wherein one or more of the data are provided in real time, or near-real time.

8. The method of claim 1, wherein the estimated delivery times are determined from real time, or near-real time, and historical tracking data.

9. The method of claim 8, further comprising weighting the historical and real time, or near-real time, tracking data to increase weight of real time, or near-real time, tracking data over historical tracking data.

10. The method of claim 1, wherein the analyzing step further comprises using weather or news feeds for the induction points and the routes between each induction points and each recipient.

11. The method of claim 1, further comprising obtaining the plurality of electronic document files from a plurality of different providers.

12. The method of claim 1, further comprising converting the plurality of electronic document files to a common format before the sending step.

13. The method of claim 12, wherein the common format is virtual dynamic document (VDD).

14. The method of claim 1, further comprising extracting one or more postal addresses for recipients from the plurality of electronic document files.

15. The method of claim 1, wherein the selected printer or the selected transportation method is a third-party provider.

16. The method of claim 15, wherein one or more of the printer cost, printer capacity, alternative transport cost, alternative transport capacity bid info provided by users, and volume-based shipping discounts are provided by third party bids.

17. The method of claim 1, further comprising providing one or more of the data to a third-party.

18. The method of claim 1, further comprising determining a cost estimate for delivery of a printed mailer of one or more of the plurality of electronic document files to one or more recipients in the target delivery time based using the data.

19. The method of claim 1, wherein one or more of the induction points are for foreign post.

20. The method of claim 19, wherein the foreign post is selected from the group consisting of Royal Mail, La Poste, Deutsche Post, Japan Post, Korea Post, China Post, Canada Post, Correos de Mexico, Empresa Brasileira de Correios e Telégrafos, Russian Post, Poste Italiane, Sociedad Estatal de Correos y Telégrafos, S.A. and An Post.

* * * * *